(12) United States Patent
Imamura

(10) Patent No.: US 6,801,345 B1
(45) Date of Patent: Oct. 5, 2004

(54) COLOR IMAGE SENSOR AND IMAGE READING APPARATUS

(75) Inventor: Norihiro Imamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/579,660

(22) Filed: May 26, 2000

(30) Foreign Application Priority Data

Jun. 2, 1999 (JP) .......................................... 11-154766
Jun. 8, 1999 (JP) .......................................... 11-160790

(51) Int. Cl.⁷ ............................................... H04N 1/46
(52) U.S. Cl. ...................... 358/509; 358/513; 358/514
(58) Field of Search .............................. 358/483, 482, 358/514, 513, 512, 475, 509, 496, 484; 250/208.1, 234–236; 382/312, 313

(56) References Cited

U.S. PATENT DOCUMENTS 5,902,993 A     5/1999  Okushiba et al.  ........ 250/208.1
6,166,832 A  * 12/2000  Fujimoto ................... 358/484
6,195,183 B1 *  2/2001  Fujimoto et al. .......... 358/514

FOREIGN PATENT DOCUMENTS

JP           8-88807         9/1994

* cited by examiner

Primary Examiner—Cheukfan Lee
(74) Attorney, Agent, or Firm—Merchant & Gould P.C.

(57) ABSTRACT

A color image sensor is provided which includes a generally sector-shaped prism having a shorter edge surface facing a white light emitting surface of a white light emitting diode, a longer edge facing a read surface of the document, a front and a rear surfaces spaced from each other in the thickness direction of the prism. The front and rear surfaces are so curved as to collect white light emitted from the white light emitting diode onto the read surface of a document. The sensor further includes a semiconductor color sensor having a plurality of red light receiving elements, a plurality of blue light receiving elements and a plurality of green light receiving elements for receiving light reflected on the read surface at the respective light receiving elements for simultaneously outputting red, blue and green image signals, and a rod lens array for forming a non-magnified erect image on the light receiving elements of the, semiconductor color sensor in accordance with light reflected on the read surface.

22 Claims, 19 Drawing Sheets

FIG.22

|       | R | G | B |
|-------|---|---|---|
| $t_1$ | 1 | 3 | 5 |
| $t_2$ | 2 | 4 | 6 |
| $t_3$ | 3 | 5 | 7 |
| $t_4$ | 4 | 6 | 8 |
| ⋮     | ⋮ | ⋮ | ⋮ |

FIG.23

|           | R   | G   | B   |
|-----------|-----|-----|-----|
| $t_n$     | n-4 | n-2 | n   |
| $t_{n+1}$ | n-5 | n-3 | n-1 |
| $t_{n+2}$ | n-6 | n-4 | n-2 |
| $t_{n+3}$ | n-7 | n-5 | n-3 |
| ⋮         | ⋮   | ⋮   | ⋮   |

COLOR IMAGE SENSOR AND IMAGE READING APPARATUS

TECHNICAL FIELD

The present invention relates to a color image sensor which is movable relative to a document at least in a secondary scanning direction for reading an image on the document. It also relates to an image reading apparatus incorporating such a color image sensor.

BACKGROUND ART

Among prior-art color image sensors, a serial type color image sensor is known which comprises wiring boards 51, 57, an array of light emitting diodes 52, a prism 53, lenses 54, 56, a mirror 55, a semiconductor sensor 58, and a flexible cables 59, 60, as shown in FIG. 31. The light emitting diode array 52 comprises two green light emitting diodes 52G, two blue light emitting diodes 52B, and one red light emitting diode 52R, as shown in FIG. 32.

In such a prior-art serial type color image sensor, the red, the green and the blue light emitting diodes 52R, 52G, 52B of the light emitting diode array 52 are selectively turned on in succession to emit light. The light is collected by the prism 53 to irradiate an image read surface 65. The light reflected on the image read surface 65 is reduced by the lens 54, and changes its direction at the mirror 55 to be directed to the lens 56. The light is further reduced by the lens to be incident on a light receiving surface of the semiconductor sensor 58. The semiconductor sensor 58 outputs a signal corresponding to the received amount of light to the outside via the wiring board 57, the flexible cable 60, and a non-illustrated connector. Signals for driving the light emitting diode array 52 is fed from the outside via the connector, the flexible cable 60, the wiring board 57 and the flexible cable 59. The semiconductor sensor 58 is supplied with electric power and various control signals from the outside via the connector, the flexible cable 60 and the wiring board 57.

With such a prior-art serial type color image sensor, it is impossible to reliably collect light from the light emitting diode array 52 onto the image read surface 65, because the prism 53 is not satisfactorily configured on sufficient study. Further, since the red, the green and the blue light emitting diodes 52R, 52G, 52B are repetitively turned on in succession to read an image, the reading speed is low. Moreover, banding is likely to occur due to the temperature characteristics of the red light emitting diode 52R. Furthermore, in such a reduction type optical system, the lenses 54, 56 may cause image distortion, which also leads to banding. Highly accurate assembly is needed to solve this problem. Further, because of the complicated structure incorporating a large number of parts, there is a problem that the cost for the parts and assembly becomes unfavorably high.

On the other hand, among prior-art color image sensors, a contact type color image sensor is also known which includes an elongate transparent light guide member. Light from a light source enters the light guide member at an end surface thereof and is guided toward a read surface.

However, in such a prior-art contact type color image sensor, it is difficult to guide light from the light source to the read surface efficiently and evenly. To enhance the light-collecting efficiency and uniformity, a light guide member having a more complicated shape is necessary, and the assembly needs to be performed with high accuracy, which increases the parts cost.

DISCLOSURE OF THE INVENTION

The present invention, which has been conceived under the circumstances described above, has as an object to provide a color image sensor and an image reading apparatus which are capable of guiding light from the light source to a read surface efficiently and evenly. Another object of the present invention is to provide a serial type color image sensor and an image reading apparatus which are capable of providing a high reading speed, reducing banding, and reducing the manufacturing cost.

In accordance with a first aspect of the present invention, there is provided a color image sensor movable relative to a document at least in a secondary scanning direction for reading an image on the document comprising: a white light emitting diode for emitting white light; a generally sector-shaped prism having a shorter edge surface facing a white light emitting surface of the white light emitting diode, a longer edge surface facing a read surface of the document, a front and a rear surfaces spaced from each other in the thickness direction of the prism, the front and rear surfaces being so curved as to collect white light emitted from the white light emitting diode onto the read surface of the document; a semiconductor color sensor including a plurality of red light receiving elements, a plurality of blue light receiving elements and a plurality of green light receiving elements for receiving light reflected on the read surface and for simultaneously outputting red, blue and green image signals; and a lens means for forming a non-magnified erect image on the light receiving elements of the semiconductor color sensor in accordance with light reflected on the read surface.

According to a preferred embodiment, a single white light emitting diode, a single prism and a single semiconductor color sensor are provided, and the color image sensor is movable relative to the document both in a primary scanning direction and the secondary scanning direction for reading the image on the document.

Preferably, the lens means may comprise a rod lens array.

Preferably, the lens means may comprise a pair of convex lens arrays disposed in series in an optical axis direction.

Preferably, the white light emitting diode and the semiconductor color sensor may be mounted on a common wiring board.

Preferably, the color image sensor may further comprise a housing for accommodating the prism and the lens means, wherein the housing has a pair of first counterpart surfaces which face edge surfaces of the wiring board, respectively, and a pair of second counterpart surfaces which face edge surfaces of the white light emitting diode, respectively. A total spacing between the second counterpart surfaces of the housing and the edge surfaces of the white light emitting diode may be set smaller than a total spacing between the first counterpart surfaces of the housing and the edge surfaces of the wiring board. The white light emitting diode may be positionally limited by the second counterpart surfaces, thereby positioning the wiring board.

Preferably, the color image sensor may further comprise a transparent cover member provided between the read surface and each of the prism and the lens means, wherein the cover member may be integrally formed on the prism.

Preferably, the red light receiving elements, the blue light receiving elements and the green light receiving elements of the semiconductor color sensor may be respectively arranged at a predetermined pitch in a row extending in a primary scanning direction. The rows of red, blue and green light receiving elements may be spaced from each other at a predetermined pitch in the secondary scanning direction.

Preferably, the pitch between the rows of red, blue and green light receiving elements in the secondary scanning direction is twice the pitch between the light receiving elements of a same color in the primary scanning direction.

According to a second aspect of the present invention, there is provided an image reading apparatus incorporating the above-described color image sensor, wherein the red light receiving elements, the blue light receiving elements and the green light receiving elements of the semiconductor color sensor are respectively arranged at a first pitch in a row extending in the primary scanning direction, the rows of red, blue and green light receiving elements are spaced from each other at a predetermined pitch in the secondary scanning direction; the image reading apparatus comprising: a secondary scanning direction driving section for reciprocally moving the document and the color image sensor relative to each other at a second pitch in the secondary scanning direction; a primary scanning direction driving section for moving the document and the color image sensor relative to each other at a third pitch in the primary scanning direction after every forward movement and after every reverse movement, respectively, by the secondary scanning direction driving section; and an image processing section for combining the image signals of the different colors from the semiconductor color sensor into a set of red, blue, and green image signals for each identical pixel while disregarding a line of image signals which do not contain image signals of either color.

Preferably, the second pitch maybe equal to the first pitch, and the pitch between the rows of red, blue and green light receiving elements in the secondary scanning direction may be twice the first pitch.

According to a third aspect of the present invention, there is provided a color image sensor movable relative to a document both in a primary scanning direction and a secondary scanning direction for reading an image on the document comprising: a white light emitting diode for emitting white light; a semiconductor color sensor including a plurality of red light receiving elements, a plurality of blue light receiving elements and a plurality of green light receiving elements for receiving light reflected on the document and for simultaneously outputting red, blue and green image signals; and a lens means for forming a non-magnified erect image on the light receiving elements of the semiconductor color sensor in accordance with light reflected on the document.

Preferably, a single white light emitting diode may be provided.

Preferably, the red light receiving elements, the blue light receiving elements and the green light receiving elements of the semiconductor color sensor may be respectively arranged at a predetermined pitch in a row extending in a primary scanning direction. The rows of red, blue and green light receiving elements may be spaced from each other at a predetermined pitch in the secondary scanning direction.

Preferably, the pitch between the rows of red, blue and green light receiving elements in the secondary scanning direction may be twice the pitch between the light receiving elements of a same color in the primary scanning direction.

Preferably, the lens means may comprise a rod lens array.

Preferably, the lens means may comprise two convex lens arrays disposed in series in an optical axis direction.

Preferably, the color image sensor may further comprise a housing for accommodating the white light emitting diode, the semiconductor color sensor and the lens means; wherein the housing may be formed with a light guide hole for guiding white light emitted from the white light emitting diode to the document, and at least wall surfaces of the housing defining the light guide hole may be white.

Preferably, the housing may be entirely white. Preferably, the white light emitting diode and the semiconductor color sensor may be mounted on a common wiring board.

Preferably, the color image sensor may further comprise a clip type connecting means mounted on the wiring board, wherein the connecting means may supply electric power from outside the wiring board to the white light emitting diode while feeding image signals of each color from the semiconductor color sensor to outside the wiring board.

Preferably, the connecting means may comprise a clip pin.

Preferably, the connecting means may comprise a clip connector.

According to a fourth aspect of the present invention, there is provided an image reading apparatus incorporating the above-described color image sensor, wherein the red light receiving elements, the blue light receiving elements and the green light receiving elements of the semiconductor color sensor are respectively arranged at a first pitch in a row extending in the primary scanning direction, the rows of red, blue and green light receiving elements are spaced from each other at a predetermined pitch in the secondary scanning direction; the image reading apparatus comprising: a secondary scanning direction driving section for reciprocally moving the document and the color image sensor relative to each other at a second pitch in the secondary scanning direction; a primary scanning direction driving section for moving the document and the color image sensor relative to each other at a third pitch in the primary scanning direction after every forward movement and after every reverse movement, respectively, by the secondary scanning direction driving section; and an image processing section for combining the image signals of the different colors from the semiconductor color sensor into a set of red, blue, and green image signals for each identical pixel while disregarding a line of image signals which do not contain image signals of either color.

Preferably, the second pitch may be equal to the first pitch, and the pitch between the rows of red, blue and green light receiving elements in the secondary scanning direction may be twice the first pitch.

According to the present invention, the prism is generally sector-shaped with the shorter edge facing the white light emitting surface of the white light emitting diode, and the longer edge facing the read surface. Further, the front and the rear surfaces spaced in the thickness direction of the prism are so curved as to collect white light emitted from the white light emitting diode onto the read surface. Therefore, it is possible to collect light from the light emitting diode at the read surface efficiently and evenly.

Further, according to the present invention, a semiconductor color sensor is provided which includes a white light emitting diode for emitting white light, a plurality of red light receiving elements, a plurality of blue light receiving elements and a plurality of green light receiving elements for receiving light reflected on the document and for simultaneously outputting red, blue and green image signals. Therefore, it is possible to obtain red, blue and green image signals simultaneously by lighting the white light emitting diode, which increases the reading speed. Further, since a white light emitting diode is used, it is possible to avoid banding which may otherwise caused due to the temperature characteristics of a red light emitting diode. Furthermore, since a reduction type optical system is not used, banding due to image distortion by the lens can be reliably reduced without the need for highly accurate assembly. Moreover, because of the simple structure and small number of parts, it is possible to reduce the manufacturing cost.

Other features and advantages of the present invention will become clearer from the description of embodiments given below with reference to the accompanying drawings.

BRIEF DESCRIPTION OF THE DRAWINGS

FIG. 22 illustrates lines which are simultaneously read by light receiving elements of respective colors during forward movement in the secondary direction.

FIG. 23 illustrates lines which are simultaneously read by light receiving elements of respective colors during reverse movement in the secondary direction.

BEST MODE FOR CARRYING OUT THE INVENTION

An embodiment of the present invention will be described below with reference to FIGS. 1 through 23.

Figure 1:
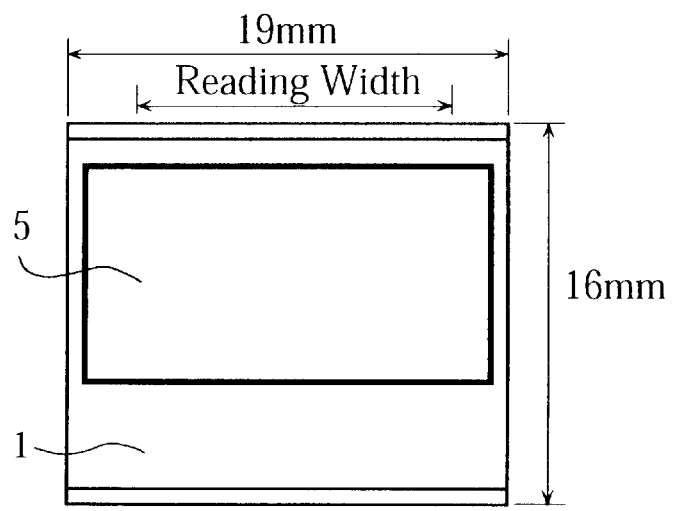
FIG. 1 is a plan view of a serial type color image sensor as an example of color image sensor in accordance with the present invention.
Figure 2:
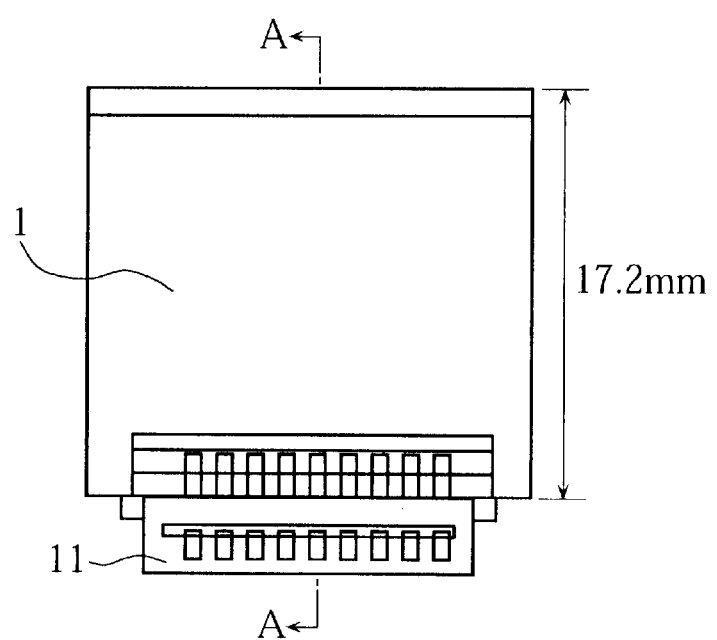
FIG. 2 is a front view of the serial type color image sensor as an example of color image sensor in accordance with the present invention.
Figure 3:
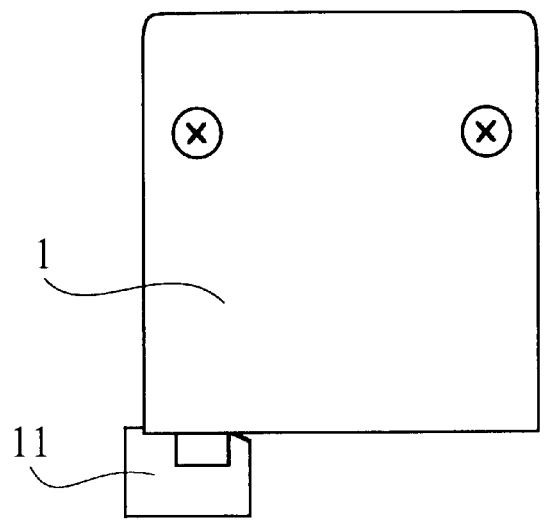
FIG. 3 is a right side view of the serial type color image sensor as an example of color image sensor in accordance with the present invention.
Figure 4:
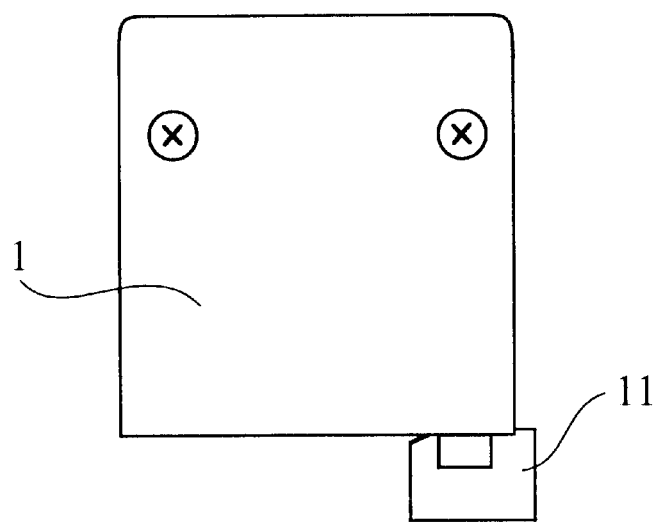
FIG. 4 is a left side view of the serial type color image sensor as an example of color image sensor in accordance with the present invention.
Figure 5:
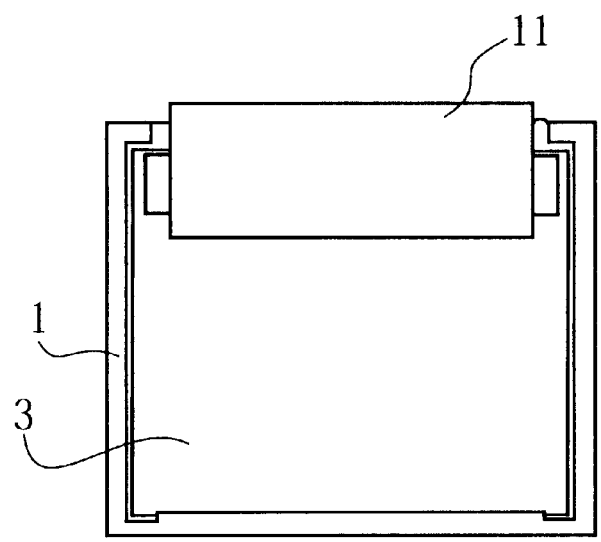
FIG. 5 is a bottom view of the serial type color image sensor as an example of color image sensor in accordance with the present invention.
Figure 6:
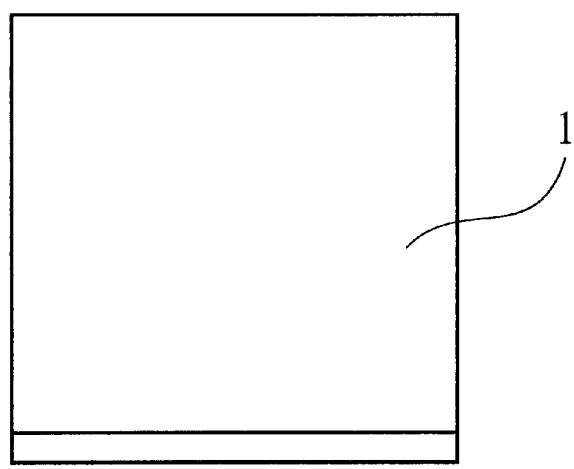
FIG. 6 is a rear view of the serial type color image sensor as an example of color image sensor in accordance with the present invention.
Figure 7:
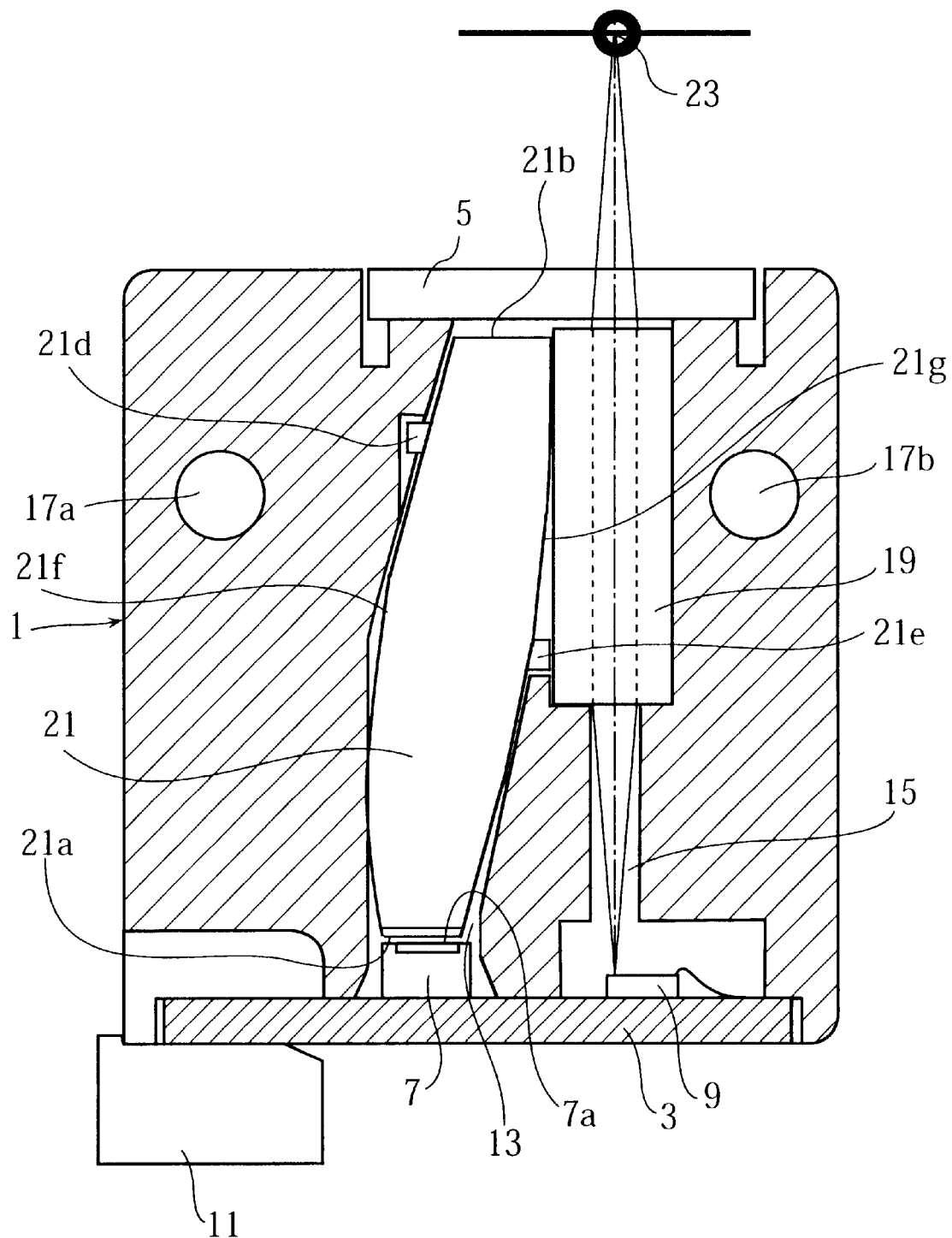
FIG. 7 is a sectional view taken along lines A-A in FIG. 2.

FIG. 1 is a plan view of a serial type color image sensor as an example of color image sensor of the present invention. FIG. 2 is a front view of the same. FIG. 3 is a right side view of the same. FIG. 4 is a left side view of the same. FIG. 5 is a bottom view of the same. FIG. 6 is a rear view of the same. FIG. 7 is a sectional view taken along lines A—A in FIG. 2. The serial type color image sensor has a housing 1 including a bottom surface on which a wiring board 3 is mounted. The housing 1 has an upper surface on which a glass plate 5 is mounted. The wiring board 3 carries a white light emitting diode 7 as a light source for reading a document, and a semiconductor color sensor 9 for outputting red, green and blue image signals representative of an image on the document. A clip connector 1 is mounted to the wiring board 3.

The housing 1 is formed with a light guide hole 13 extending from the upper surface of the wiring board 3 to the lower surface of the glass plate 5, a through-hole 15 provided adjacent to the light guide hole 13 and extending from the lower surface of the glass plate 5 to the upper surface of the wiring board 3, and bolt holes 17a, 17b for assembling structural parts of the housing 1. The light guide hole 13 communicates with the through-hole 15 at respective upper half portions. The through-hole 15 incorporates, in its upper half portion, a rod lens array 19. The rod lens array 19 has an upper surface located close to the lower surface of the glass plate 5. A prism 21 is mounted in the light guide hole 13A. The white light emitting diode 7 is disposed at the bottom of the light guide hole 13. The semiconductor color sensor 9 is disposed at the bottom of the through-hole 15. The prism 21 has a lower surface located close to a white light emitting surface 7a of the white light emitting diode 7. The prism 21 has an upper surface located close to the lower surface of the glass plate 5.

Each structural part of the housing 1 is made of a black resin. In this embodiment, the housing 1 is 19 mm long, 16 mm wide, and 17.2 mm high, as shown in FIGS. 1 and 2. The white light emitting diode 7 may comprise a GaN-based white light emitting diode including a fluorescent layer, or a ZnSe-based white light emitting diode without a fluorescent layer.

Figure 8:
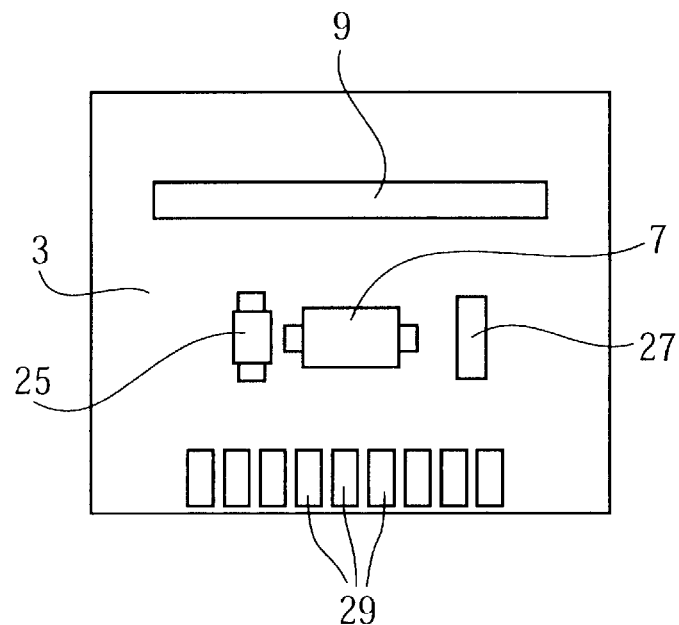
FIG. 8 is an enlarged plan view of a wiring board.

FIG. 8 is a plan view of the wiring board 3. The wiring board 3 is provided with passive components 25, 27 and a plurality of terminals 29, in addition to the white light emitting diode 7 and the semiconductor color sensor 9.

Figure 9:
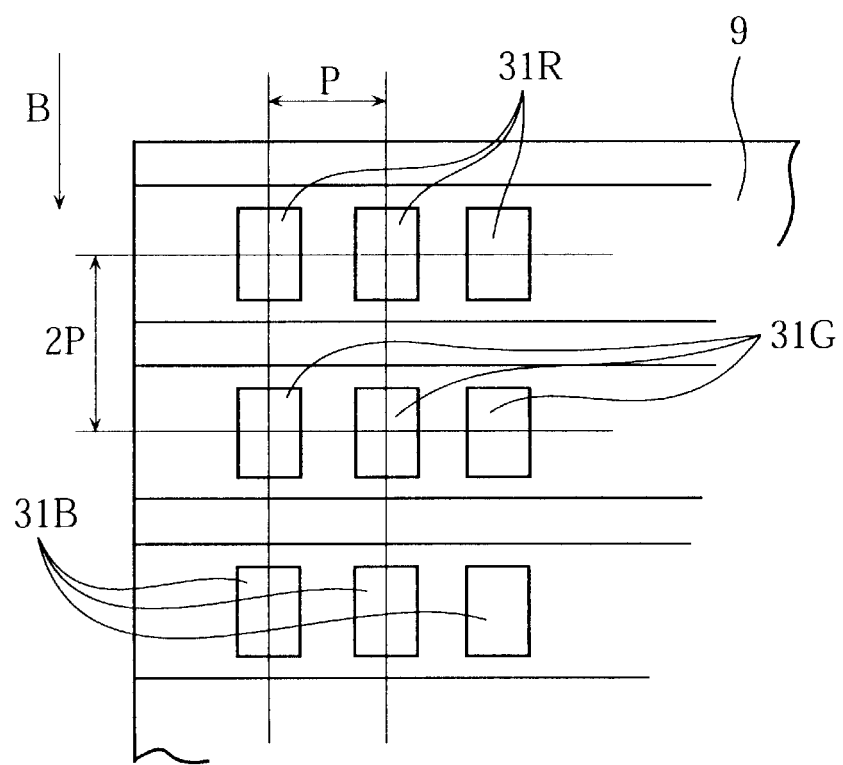
FIG. 9 is a fragmentary enlarged plan view of a semiconductor color sensor.

FIG. 9 is an enlarged plan view of the semiconductor color sensor 9. The semiconductor color sensor is provided with a plurality of red light receiving elements 31R, a plurality of green light receiving elements 31G, and a plurality of blue light receiving elements 31B. The light receiving elements 31R, 31G, 31B in each color group are arranged at a predetermined pitch P in a row extending in the primary scanning direction, i.e., longitudinally of the semiconductor color sensor 9. The pitch between two adjacent groups of light receiving elements 31R, 31G, and between two adjacent groups of light receiving elements 31G, 31B is 2P which is twice the pitch P. Each of the light receiving element 31R, 31G, 31B comprises a photodiode having a light receiving surface covered with a color filter. In addition to the photodiodes, the semiconductor color sensor 9 includes field-effect transistors for outputting the electric charge stored in the respective photodiodes, and a shift register for serially turning on the field-effect transistors. In this embodiment, each group of light receiving elements 31R, 31G, 31B includes 304 elements to provide a reading density of 600 dpi.

Figure 10:
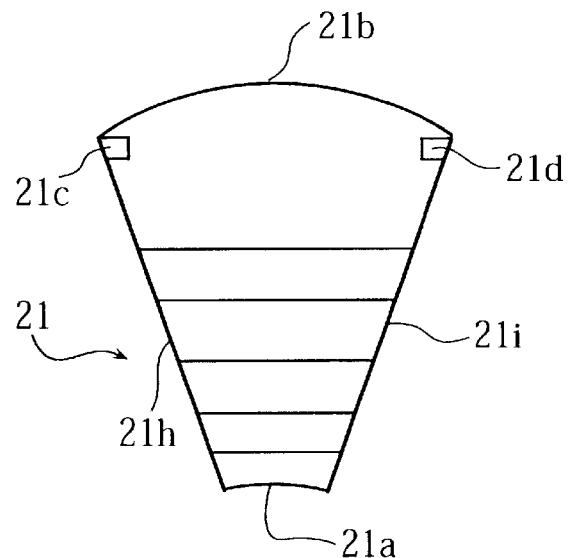
FIG. 10 is a front view of a prism.
Figure 11:
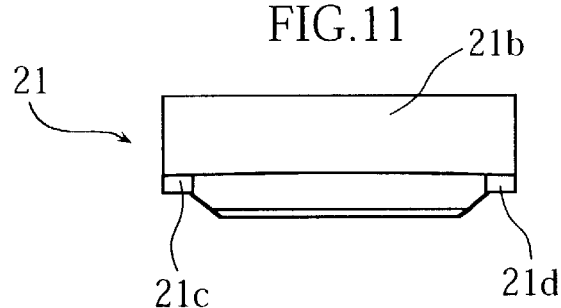
FIG. 11 is a plan view of the prism.
Figure 12:
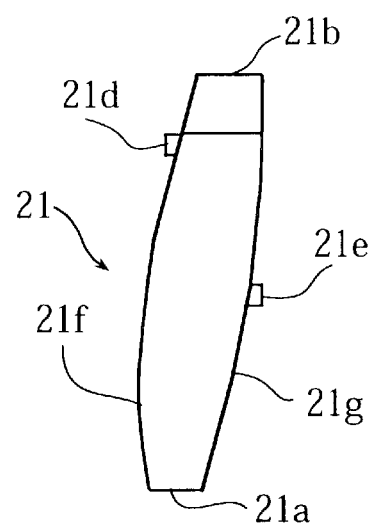
FIG. 12 is a right side view of the prism.
Figure 13:
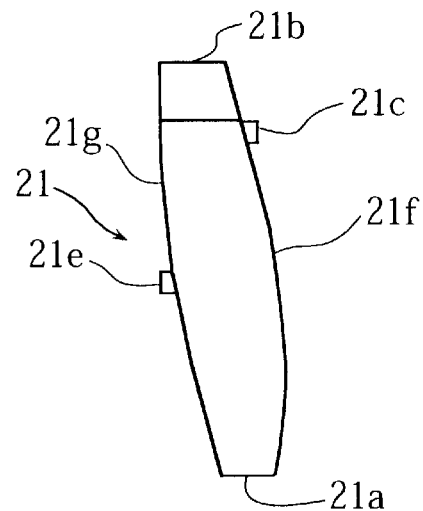
FIG. 13 is a left side view of the prism.
Figure 14:
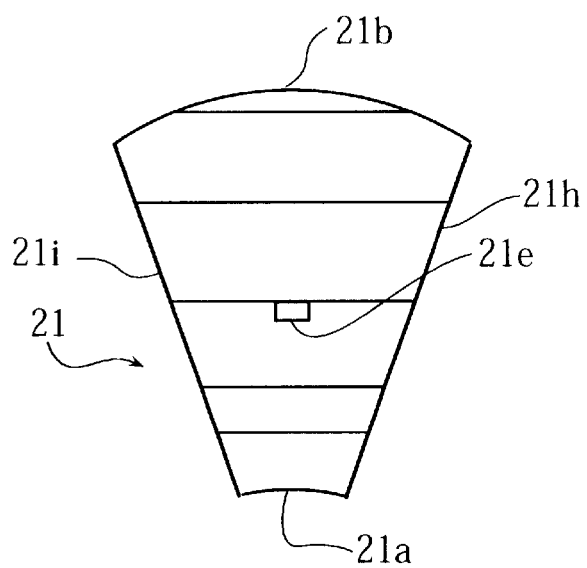
FIG. 14 is a rear view of the prism.
Figure 15:
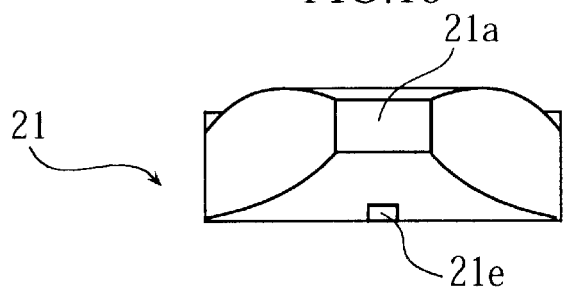
FIG. 15 is a bottom view of the prism.

FIG. 10 is a front view of the prism 21. FIG. 11 is a plan view of the same. FIG. 12 is a right side view of the same. FIG. 13 is a left side view of the same. FIG. 14 is a rear view of the same. FIG. 15 is a bottom view of the same. The prism 21 is generally sector-shaped. The prism 21 has a shorter edge surface 21a which faces the white light emitting surface 7a of the white light emitting diode 7. The prism 21 has a longer edge surface 21b which faces a read surface 23. The prism 21 is integrally formed with a pair of projections 21c, 21d provided on the front surface at upper opposite corners. The prism 21 is integrally formed with a projection 21e provided centrally in the rear surface. As shown in FIG. 7, the projections 21c, 21d, 21e are used for positioning and retaining the prism 21 in the housing 1.

Figure 16:
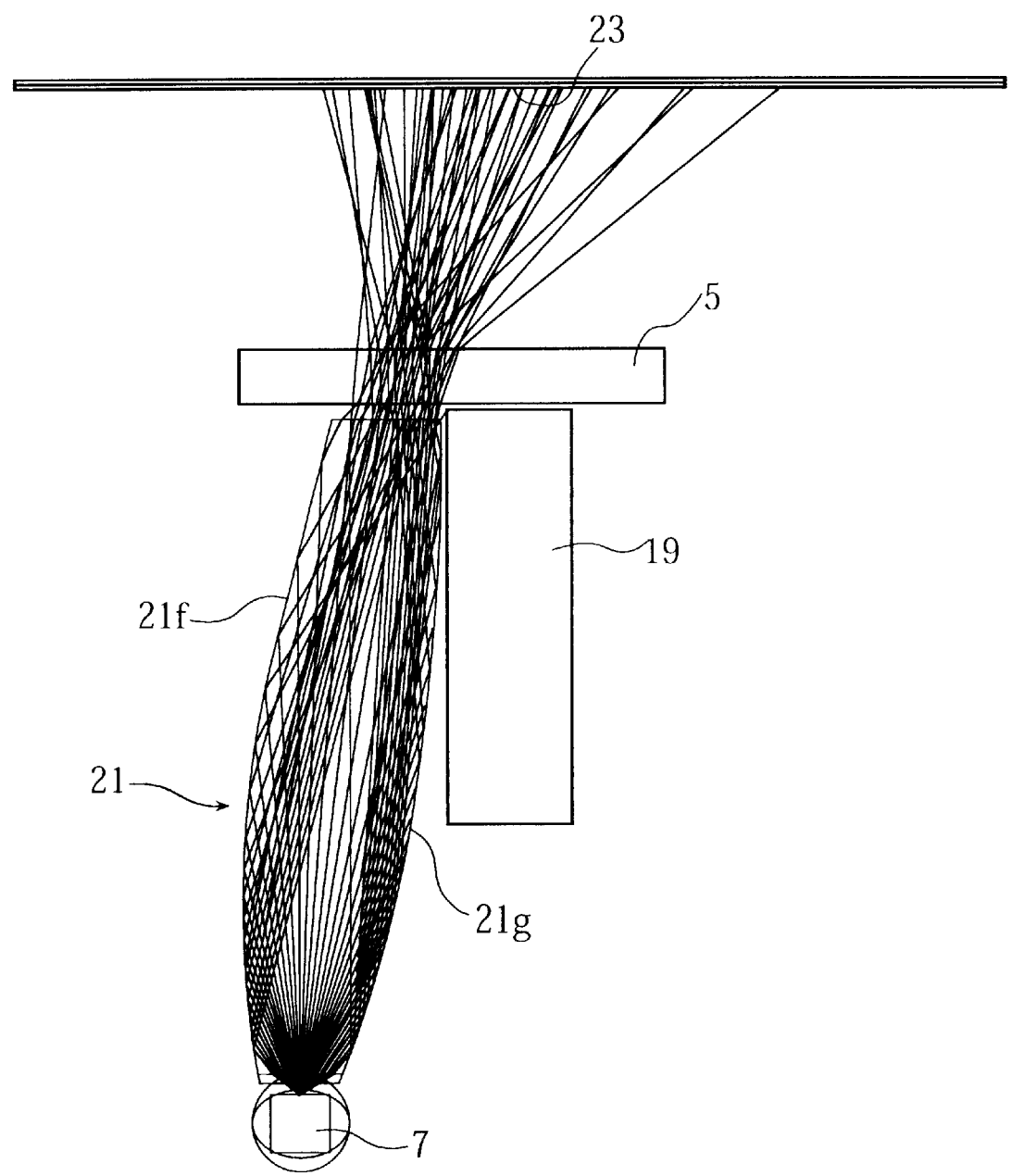
FIG. 16 shows the light path of white light passing through the prism as viewed from a side of the prism.
Figure 17:
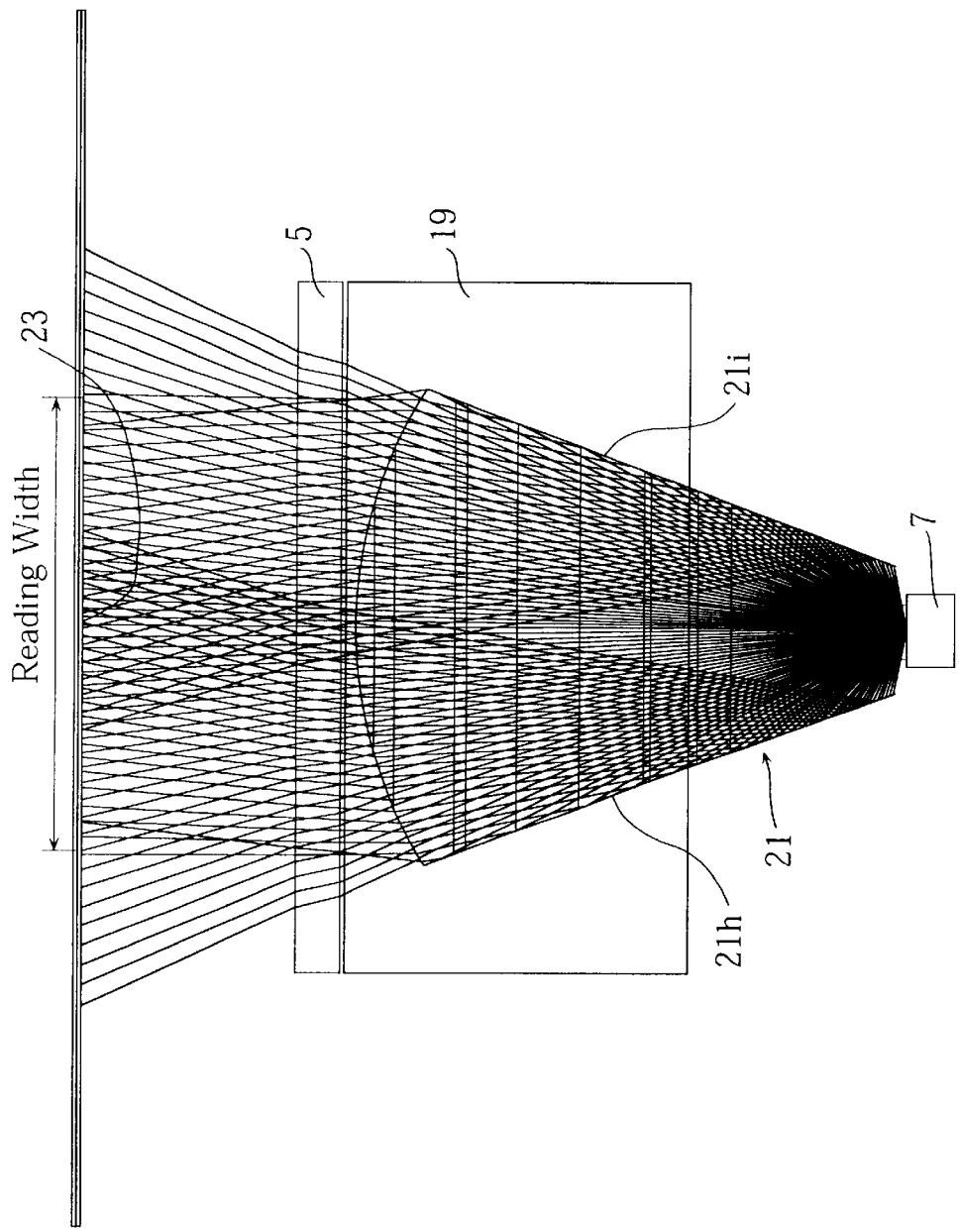
FIG. 17 shows the light path of white light passing through the prism as viewed from the front of the prism.
Figure 18:
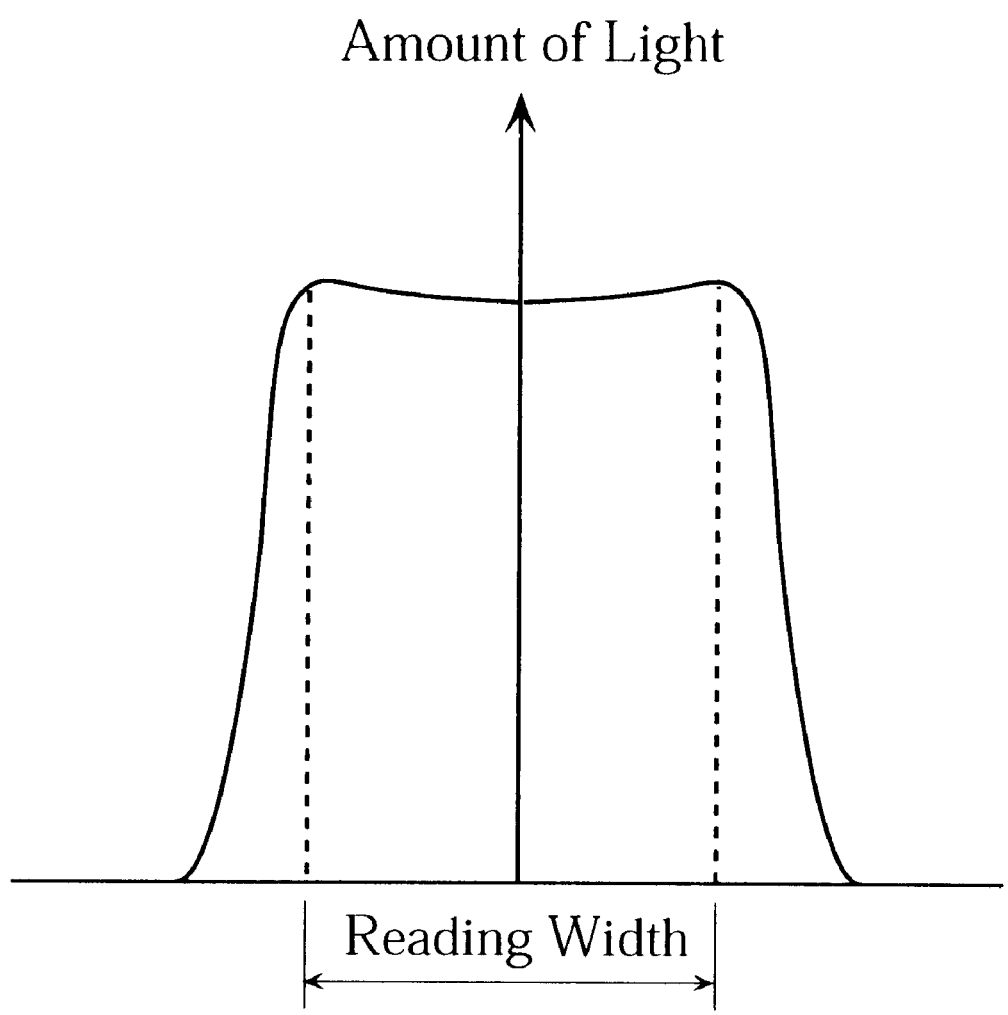
FIG. 18 shows light distribution of white light irradiating the document after passing through the prism.

FIG. 16 shows the light path of white light passing through the prism 21 as viewed from a side of the prism 21. FIG. 17 shows the light path of white light passing through the prism 21 as viewed from the front of the prism 21. As is clear from FIG. 16, the front surface 21f and the rear surface 21g of the prism 21 are spaced in the thickness direction of the prism 21. The front and the rear surfaces are so curved as to collect white light emitted from the white light emitting diode 7 onto the read surface 23. Specifically, the front and the rear surfaces 21f, 21g are so curved that white light traveling within the prism 21 outwardly is reflected inwardly by the front surface 21f and the rear surface 21g to be directed to the read surface 23. Further, as is clear from FIG. 17, the prism 21 has radially-extending planer side surfaces 21h, 21i which are so configured that white light traveling within the prism 21 outwardly is reflected inwardly by the side surfaces 21h, 21i to be directed to the read surface 23. Thus, as a result of passing through the prism 21, the amount of white light irradiating the document becomes substantially even over the entire reading width.

Figure 19:
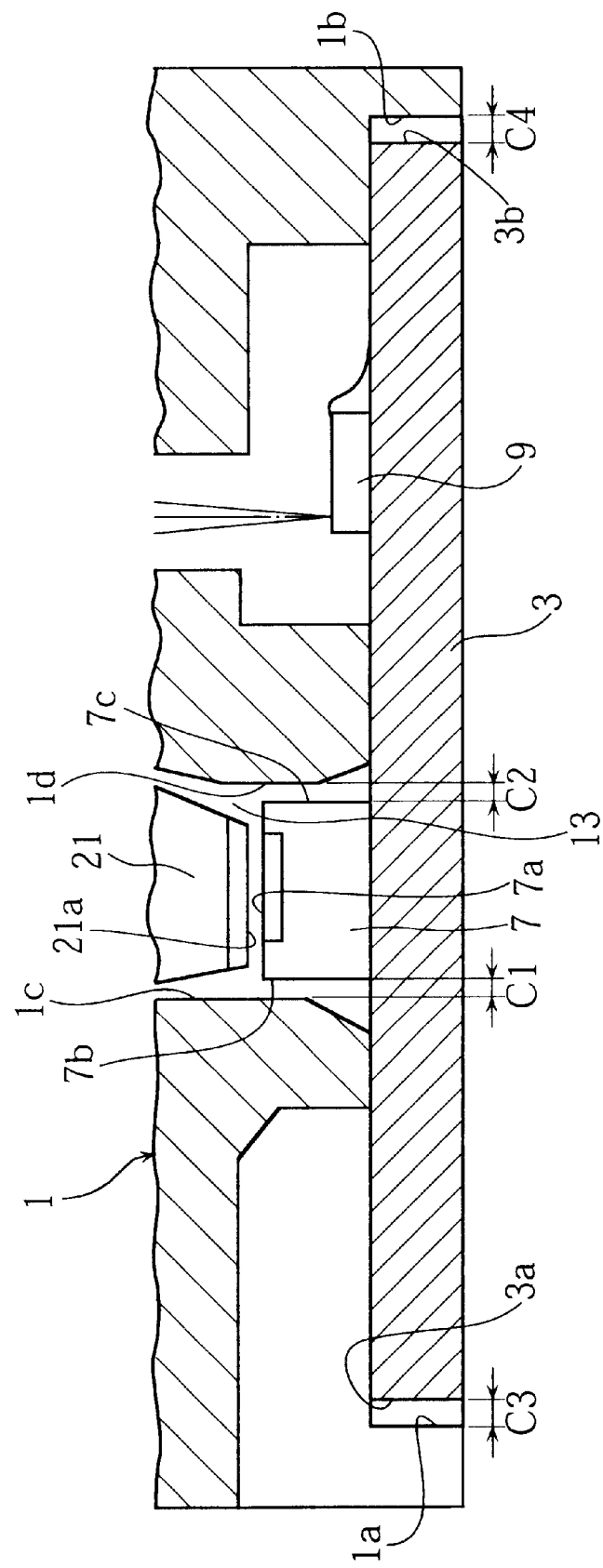
FIG. 19 is an enlarged sectional view of a bottom portion of the serial type color image sensor as an example of color image sensor in accordance with the present invention.

FIG. 19 is an enlarged sectional view showing a bottom portion of the color image sensor. For facilitating the illustration, the clip connector 11 omitted in FIG. 19. The housing 1 has a pair of first counterpart surfaces 1a, 1b which face edge surfaces 3a, 3b of the wiring board 3, respectively, and a pair of second counterpart surfaces 1c, 1d which face edge surfaces 7b, 7c of the white light emitting diode 7, respectively. The sum C1+C2 is set smaller than the sum C3+C4, wherein C1 is the spacing between the edge surface 7b of the white light emitting diode 7 and the second counterpart surface 1c of the housing 1, C2 is the spacing between the edge surface 7c of the white light emitting diode 7 and the second counterpart surface 1d of the housing 1, C3 is the spacing between the edge surface 3a of the wiring board 3 and the first counterpart surface 1a of the housing 1, and C4 is the spacing between the edge surface 3b of the wiring board 3 and the first counterpart face 1b of the housing 1.

Figure 20:
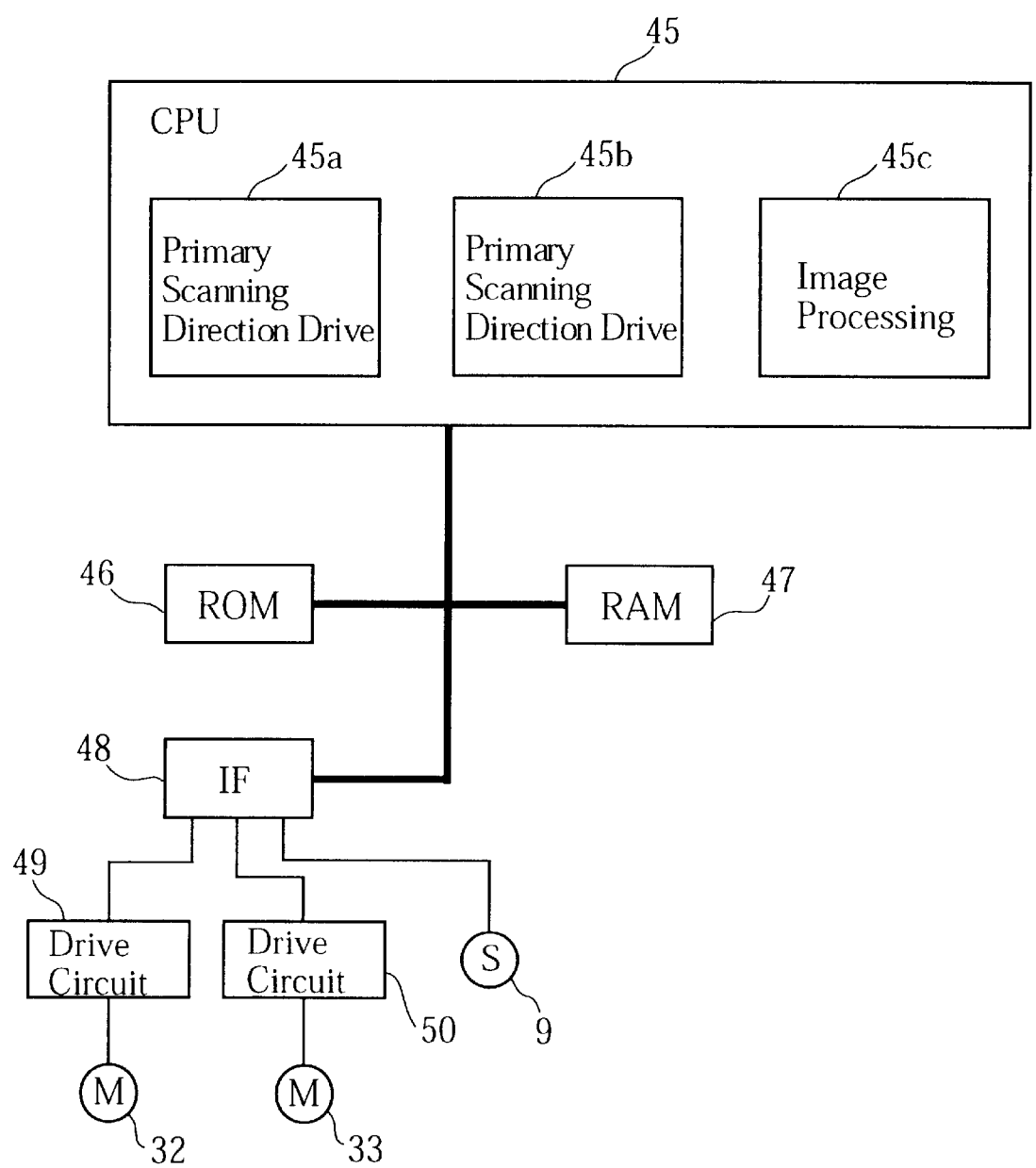
FIG. 20 is a block circuit diagram of a control section of the image reading apparatus in accordance with the present invention.

FIG. 20 is a block circuit diagram showing a control section of an image reading apparatus incorporating the color image sensor described above. A CPU 45, a ROM 46, a RAM 47 and an interface circuit 48 are connected with each other via buss lines. The interface circuit 48 is connected to drive circuits 49, 50 and the semiconductor color sensor 9. The drive circuit 49 is connected to an electric motor 32 for reciprocally moving the color image sensor in the primary scanning direction. The drive circuit 50 is connected to an electric motor 33 for moving a document in the secondary scanning direction. The CPU 45 drives the electric motor 32 via the interface circuit 48 and the drive circuit 49, thereby functioning as a primary scanning direction driving section 45a for moving the color image sensor reciprocally in the primary scanning direction. The CPU 45 drives the electric motor 33 via the interface circuit 48 and the drive circuit 50, thereby functioning as a secondary scanning direction driving section 45b for moving a document in the secondary scanning direction. The CPU 45 also functions as an image processing section 45c wherein respective image signals of the three colors inputted from the semiconductor color sensor 9 via the interface circuit 48 are combined for each pixel to provide a set of red, blue, and green image signals for one pixel while signals for a line which do not contain signals for either color of the three are discarded.

Next, the operation is described. White light emitted from the white light emitting diode 7 passes through the prism 21 and the glass plate 5 to be cast on the read surface 23 of a document. At this time, white light from the white light emitting diode 7 is effectively collected by the prism 21 onto the read surface 23, and the amount of light becomes substantially even over the entire reading width. Thus, white light from the white light emitting diode 7 is uniformly guided to the read surface 23 of the document without loss for efficiently irradiating the read surface 23.

White light reflected on the read surface 23 of the document passes through the glass plate 5 to be incident on the rod lens array 19. Light is then collected by the rod lens array 19 to be incident on the light receiving elements 31R, 31G, 31B of the semiconductor color sensor 9. At this time, the rod lens array 19 forms, on a surface of the semiconductor color sensor 9, a non-magnified erect image of the image carried on the read surface 23 of the document When white light is incident on the light receiving elements 31R, 31G, 31B, the semiconductor color sensor 9 simultaneously outputs red, green and blue image signals in accordance with the amount of light incident on the light receiving elements 31R, 31G, 31B, respectively. The image signals of each color are successively outputted for each row of pixels corresponding to a respective row of light receiving elements 31R, 31G, 31B arranged at the pitch P in the primary scanning direction.

In the above process, the document remains stationary. Thereafter, the secondary scanning direction driving section 45b causes the document to be transferred in the secondary scanning direction by the pitch P for reading the next line.

By repeating the process described above, it is possible to read all the lines in one page of the document over the reading width of the serial type color image sensor.

Then, the primary scanning direction driving section 45a causes the serial type color image sensor to move in the primary scanning direction by a distance corresponding to the reading width of the image sensor for reading the respective lines. At this time, the secondary scanning direction driving section 45b causes the document to be transferred reversely in the secondary scanning direction.

By repeating the above processes, one page of the document is completely read.

Figure 21:
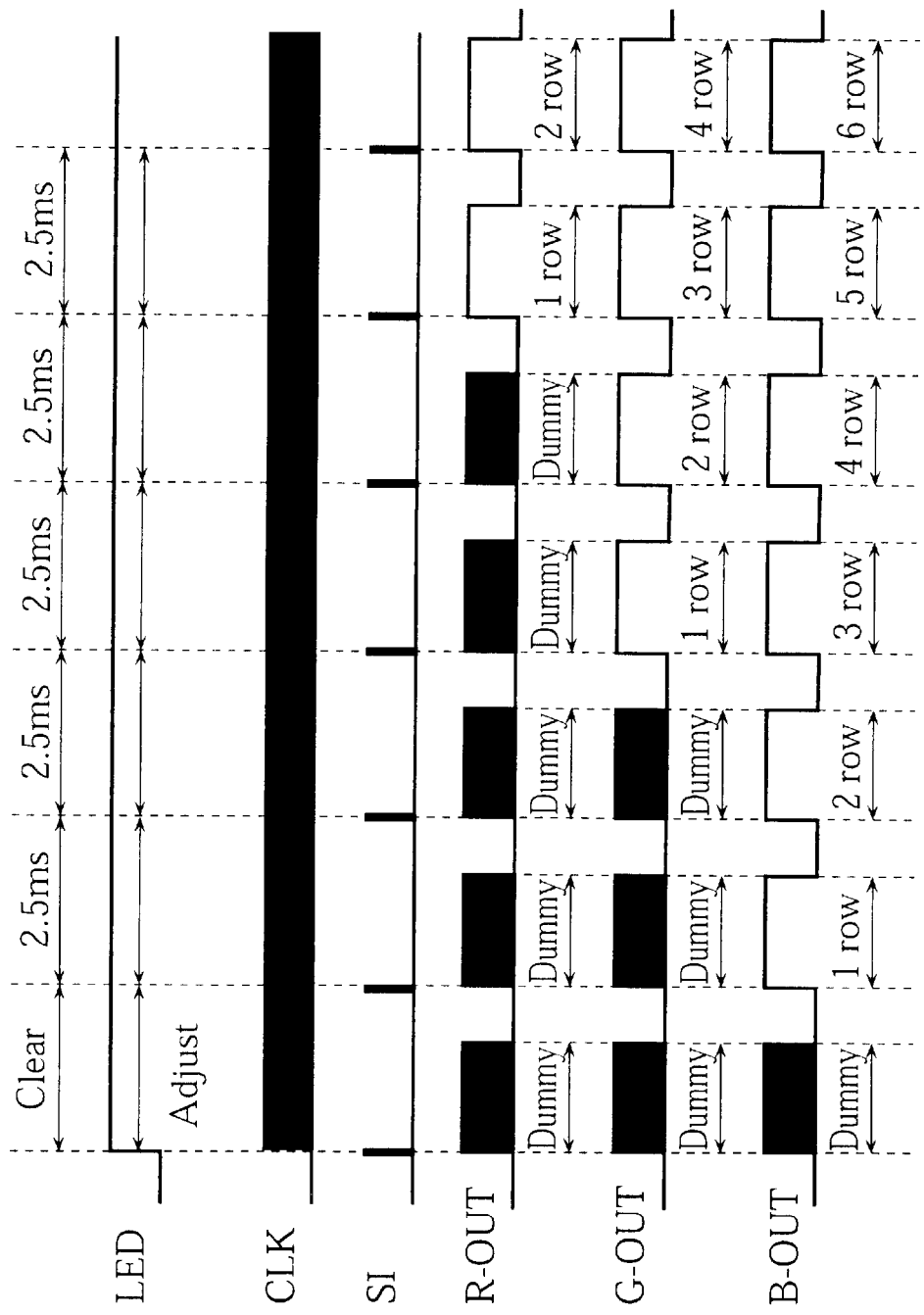
FIG. 21 illustrates the timing of operation of the semiconductor color sensor.

Specifically, as shown in FIG. 21, image signals for each color are outputted at every 2.5 msec for each line over the reading width of the serial type color image sensor. The image signals for each color are outputted in synchronism with clock signals of predetermined periodicity. In this embodiment, image signals for each color for 304 pixels are outputted in 2.5 msec. Every time the serial type color image sensor is moved in the primary scanning direction, adjustment of the driving voltage for the light emitting diode 7, and discharge of electricity charged in the photodiodes of the semiconductor color sensor 9 are performed in a 2.5 msec period.

When transferring the document in the direction of an arrow B in FIG. 9, the image reading is assumed to start upon reception, by the row of light receiving elements 31R, of a first line image of the document. At initial time $t_1$, the semiconductor color sensor 9 outputs red image signals for the first line, green image signals for the third line, and blue image signals for the fifth line, as shown in FIG. 22. At subsequent time $t_2$, the semiconductor color sensor 9 outputs red image signals for the second line, green image signals for the fourth line, and blue image signals for the sixth line. At subsequent time $t_3$, the semiconductor color sensor 9 outputs red image signals for the third line, green image signals for the fifth line, and blue image signals for the seventh line. At subsequent time $t_4$, the semiconductor color sensor 9 outputs red image signals for the fourth line, green image signals for the sixth line, and blue image signals for the eighth line. Similarly, subsequent red image signals and subsequent green image signals are outputted simultaneously by a two line deviation, and subsequent green image signals and subsequent blue image signals are outputted simultaneously by a two line deviation. This is because the row of light receiving elements 31R and the row of light receiving elements 31G deviate from each other by the pitch 2P in the secondary scanning direction while the row of light receiving elements 31G and the row of light receiving elements 31B deviate from each other by the pitch 2P in the secondary scanning direction.

When transferring the document reversely to the arrow B direction in FIG. 9, the image reading is assumed to start upon reception, by the row of light receiving portions 31B, the nth line image of the document. At initial time $t_n$, the semiconductor color sensor 9 outputs red image signals for the n-4th line, green image signals for the n-2th line, and blue image signals for the nth line, as shown in FIG. 23. At subsequent time $t_{n+1}$, the semiconductor color sensor 9 outputs red image signals for the n-5th line, green image signals for the n-3th line, and blue image signals for the n-1th line. At subsequent time $t_{n+3}$, the semiconductor color sensor 9 outputs red image signals for the n-7th line, green image signals for the n-4th line, and blue image signals for the n-2th line. At subsequent time $t_{n+3}$ the semiconductor color sensor 9 outputs red image signals for the n-7th line, green image signals for the n-5th line, and blue image signals for the n-3th line. Similarly, subsequent red image signals and subsequent green image signals are outputted simultaneously by a two line deviation, and subsequent green image signals and subsequent blue image signals are outputted simultaneously by a two line deviation. This is because the row of light receiving elements 31R and the row of light receiving elements 31G deviate from each other by the pitch 2P in the secondary scanning direction while the row of light receiving elements 31G and the row of light receiving elements 31B deviate from each other by the pitch 2P in the secondary scanning direction by the pitch 2P. In this way, the document is read from the nth line to the first line because the document is transferred reversely.

The red, green and blue image signals simultaneously outputted need to be processed for re-grouping for each pixel. This process may be performed by a buffer memory, for example, after A/D conversion of the image signals for each color from the semiconductor image sensor 9 in the image processing section 45c of the image reading apparatus. The buffer memory may be the RAM 47 or may be provided separately from the RAM 47. As with the first to fourth lines in FIG. 22 and the nth to n-3th lines in FIG. 23, signals for those lines for which either of red, green and blue is not available are discharged for inability of combining the three colors. Thus, the starting position for the reciprocal movement in the secondary direction needs to be determined in view of such discarded lines. In FIG. 21, the image signals of the discarded lines are indicated as dummy.

As described above, the prism 21 is generally sector-shaped with the shorter edge 21a facing the white light emitting surface 7a of the white light emitting diode 7, and the longer edge 21b facing the read surface 23. Further, the front and the rear surfaces 21f, 21g spaced in the thickness direction of the prism are so curved as to collect white light emitted from the white light emitting diode 7 onto the read surface 23. Accordingly, it is possible to collect light from the light emitting diode 7 at the read surface 23 efficiently and evenly.

Moreover, the sum C1+C2 is set smaller than the sum C3+C4, where C1 is the spacing between the edge surface 7b of the white light emitting diode 7 and the second counterpart surface 1c of the housing 1, C2 is the spacing between the edge surface 7c of the white light emitting diode 7 and the second counterpart surface 1d of the housing 1, C3 is the spacing between the edge surface 3a of the wiring board 3 and the first counterpart surface 1a of the housing 1, and C4 is the spacing between the edge surface 3b of the wiring board 3 and the first counterpart face 1b of the housing 1. Accordingly, it is possible to minimize unevenness of light amount received by the respective light receiving elements 31R, 31G, 31B of the semiconductor color sensor 9 which would result from a positional deviation of the white light emitting diode 7. Generally, as the prism 21 provides higher light collecting efficiency, greater unevenness will result with respect to the light amount received by the respective light receiving elements 31R, 31G, 31B due to a positional deviation of the white light emitting diode 7. However, since the sum C1+C2 is set smaller than C3+C4 according to the present invention, the positional relation between the prism 21 and the white light emitting diode 7 is kept appropriate regardless of deviation of the mounting position of the white light emitting diode 7 on the wiring board 3. As a result, it is possible to minimize unevenness in the light amount received by the respective light receiving elements 31R, 31G, 31B of the semiconductor color sensor 9. This is particularly advantageous in the case where the received light amount changes more by a positional deviation of the white light emitting diode 7 than by a positional deviation of the semiconductor color sensor 9.

Further, since only a single white light emitting diode 7 is employed as the light source, the number of parts and hence the manufacturing cost can be reduced compared with the case where red, green and blue light emitting diodes are employed. Further, it is possible to avoid inconvenience caused by combining the light emitting diodes of different colors having different wavelengths. Moreover, it is possible to avoid banding due to the temperature characteristics of the red light emitting diode.

The use of the semiconductor color sensor 9 which simultaneously outputs red, blue and green image signals increases the reading speed compared with a color sensor which utilizes monochrome light receiving elements.

Further, since the rod lens array 19 of a non-magnified erect image forming type is used as the imaging optical system, it is possible to reduce banding while facilitating the assembling.

Furthermore, the document is transferred reciprocally in the secondary scanning direction for performing reciprocal reading of the document. Accordingly, the reading speed can be increased compared with one-way reading.

Further, the mounting of the white light emitting diode 7 and the semiconductor color sensor 9 on the common wiring board 3 simplifies the structure and facilitates assembly.

Figure 24:
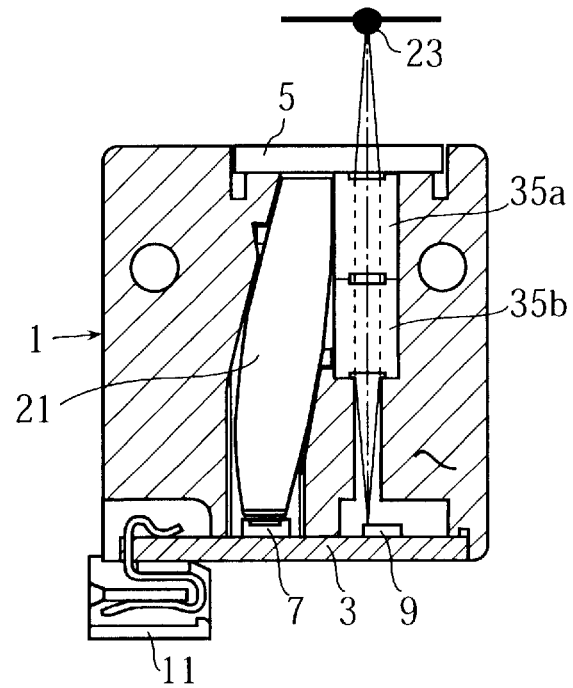
FIG. 24 is a sectional view of a serial type color image sensor in accordance with another embodiment of the present invention.

In the above-described embodiment, the rod lens array 19 is employed as an imaging optical lens system. However, as shown in FIG. 24, two convex lens arrays 35a, 35b may be employed instead of the rod lens array 19. The convex lens arrays 35a, 35b are so arranged that the respective optical axes coincide with each other. In such a structure, an expensive rod lens array 19 is not used so that it is possible to reduce the cost for the parts.

Figure 25:
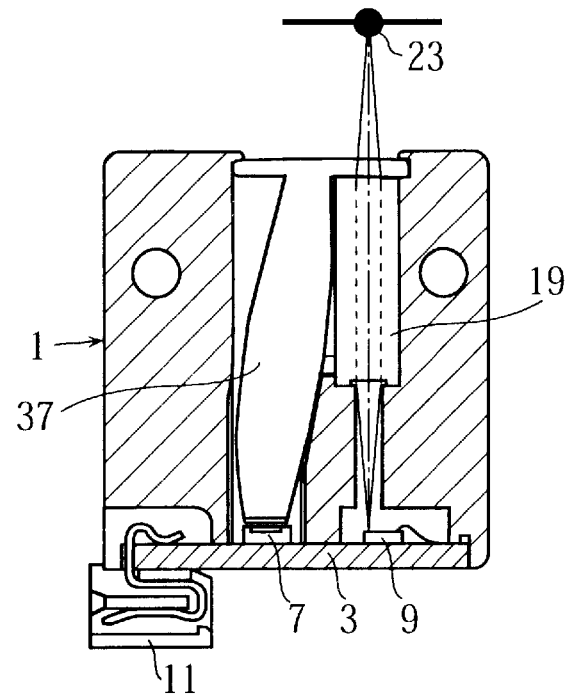
FIG. 25 is a sectional view of a serial type color image sensor in accordance with another embodiment of the present invention.

In the above-described embodiment, the glass plate 5 and the prism 21 are provided separately. Alternatively, however, a prism 37 integrally formed with a glass plate may be employed, as shown in FIG. 25. With this structure, the number of parts can be reduced, which leads to cost reduction.

Figure 26:
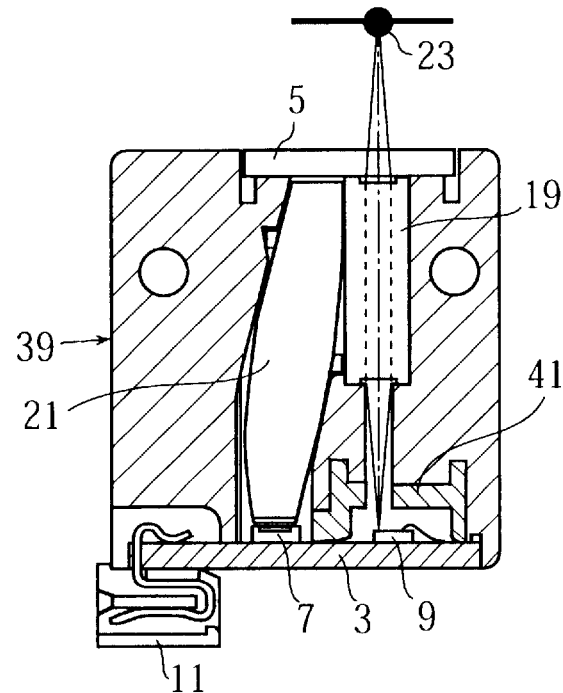
FIG. 26 is a sectional view of a serial type color image 6 sensor in accordance with another embodiment of the present invention.

Although the housing 1 is formed of a black material in the above-described embodiment, a housing 39 formed of a white material may be used, as shown in FIG. 26. With this structure, white light travelling outwardly of the prism 21 is reflected on a wall surface of the housing 1 back into the prism 21. As a result, the light collecting efficiency is enhanced. In this case, however, it is preferable to cover the semiconductor color sensor 9 with a black frame 41 so that white light irregularly reflected on wall surfaces of the housing 1 is prevented from entering the light receiving elements 31R, 31G, 31B of the semiconductor color sensor 9. The frame 41 is formed with a slit for allowing white light travelling through the rod lens array 19 to reach the light receiving elements 31R, 31G, 31B of the semiconductor color sensor 9.

Figure 27:
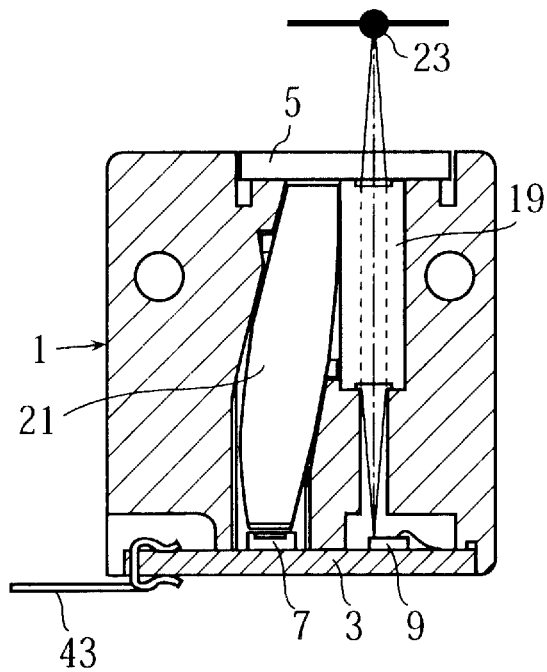
FIG. 27 is a sectional view of a serial type color image sensor in accordance with another embodiment of the present invention.

In the above-described embodiment, the wiring board 3 is provided with a clip connector 11. However, instead of the clip connector 11, clip pins 43 may be used, as shown in FIG. 27. With this structure, it is possible to solder an FPC or an FFC, which leads to cost reduction.

In the embodiment described above, the pitch between the rows of light receiving elements 31R, 31G, 31B is set twice the pitch P between adjacent light receiving elements 31R, 31G, 31B of the same color. This is just because the semiconductor color sensor 9 having such a structure can be manufactured more easily than when the row-to-row pitch is equal to P. Thus, if the manufacturing process permits, the pitch between the rows of light receiving elements 31R, 31G, 31B may be equal to the pitch P. Alternatively, the pitch between the rows of light receiving elements 31R, 31G, 31B may be set three times the pitch P.

In the above-described embodiment, the document is reciprocated in the secondary scanning direction. Instead, the serial type color image sensor may be reciprocated in the secondary scanning direction. Alternatively, both of the document and the serial type color image sensor may be reciprocated reversely to each other in the secondary scanning direction.

Further, in the above-described embodiment, the serial type color image sensor is moved in the primary scanning direction. Instead, the document may be moved in the primary scanning direction. Alternatively, both of the document and the serial type color image sensor may be moved reversely to each other in the primary scanning direction.

In the above-described embodiment, description is made as to a serial type color image sensor. However, the present invention is applicable to a line type color image sensor. In this case, a plurality of white light emitting diodes 7 and a plurality of prisms 21 are arranged in respective rows extending in the reading width direction. Further, a plurality of semiconductor color sensors 9 are arranged closely to each other in a row extending in the reading width direction so as to provide an overall reading width which coincides with the width of each read line of the document.

In the above-described embodiment, a semiconductor color sensor 9 is employed which includes photodiodes as light receiving elements. However, a semiconductor color sensor which includes phototransistor as light receiving elements may be employed.

The color image sensor and the image reading apparatus in accordance with the present invention may be employed not only in an image scanner but also in a digital copying machine, an ink jet printer or a word processor having multiple functions, for example.

Figure 28:
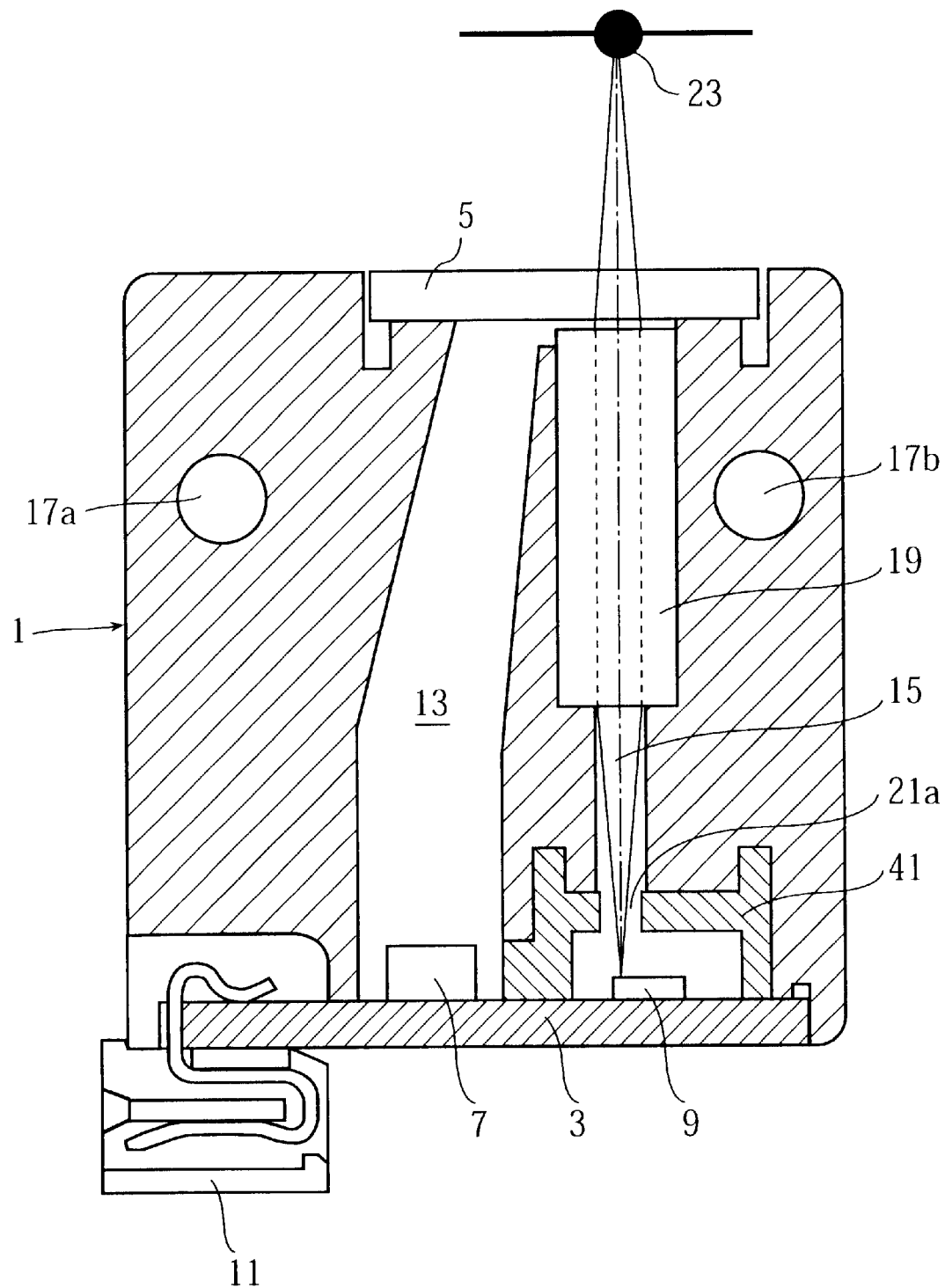
FIG. 28 is a sectional view of a serial type color image sensor in accordance with another embodiment of the present invention.

Further, as shown in FIG. 28, a white housing 1 may be employed for dispensing with the prism 21. In this embodiment, the semiconductor color sensor 9 is covered with a black frame 41 so that white light irregularly reflected on wall surfaces of the housing 1 is prevented from entering the light receiving elements 31R, 31G, 31B of the semiconductor color sensor 9. The frame 41 is formed with a slit for allowing white light travelling through the rod lens array 19 to reach the light receiving elements 31R, 31G, 31B of the semiconductor color sensor 9.

In the above embodiment, white light emitted from the white light emitting diode 7 passes through a light guide hole 13 and the glass plate 5 to irradiate the read surface 23 of a document.

Since the housing 1 is white, white light emitted from the white light emitting diode 7 and cast onto wall surfaces of the housing 1 defining the light guide hole 13 is reflected with little absorption before reaching the read surface 23. Thus, white light from the white light emitting diode 7 is guided to the read surface 23 of the document with little loss, thereby irradiating the read surface efficiently.

As described above, the use of a white housing 1 provides a light guide hole 13 having white wall surfaces, so that white light from the white light emitting diode 7 is efficiently guided to the read surface 23.

Instead of forming the entirety of the housing 1 with a white material, only the wall surfaces of the housing 1 defining the light guide hole 13 may be rendered white.

Similarly to the embodiment in which the prism 21 is used, this embodiment in which the prism 21 is eliminated may be modified in various ways.

Figure 29:
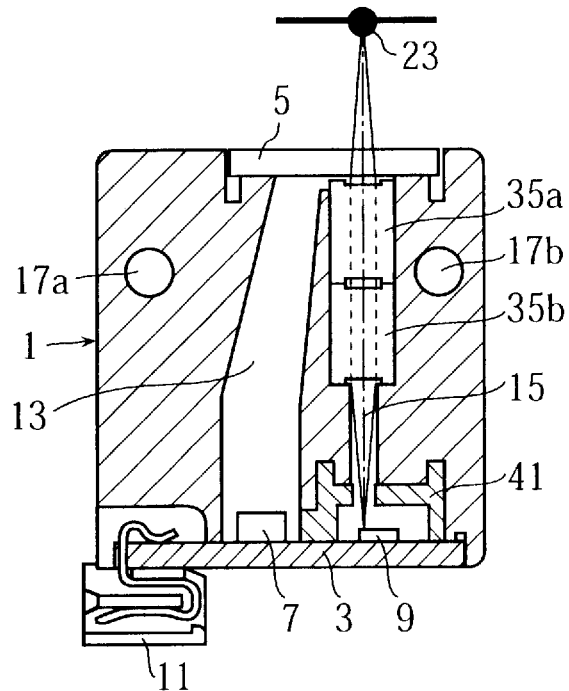
FIG. 29 is a sectional view of a serial type color image sensor in accordance with another embodiment of the present invention.

For example, instead of the rod lens array 19, two convex lens arrays 35a, 35b may be employed, as shown in FIG. 29. The convex lens arrays 35a, 35b are disposed so that the respective optical axes coincide with each other. With such a structure, an expensive rod lens array 19 can be dispensed with, which leads to cost reduction for the parts.

Figure 30:
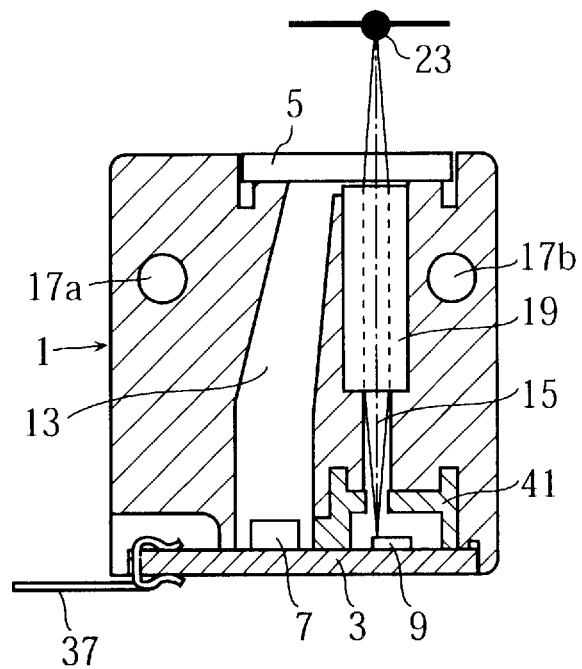
FIG. 30 is a sectional view of a serial type color image sensor in accordance with another embodiment of the present invention.
Figure 31:
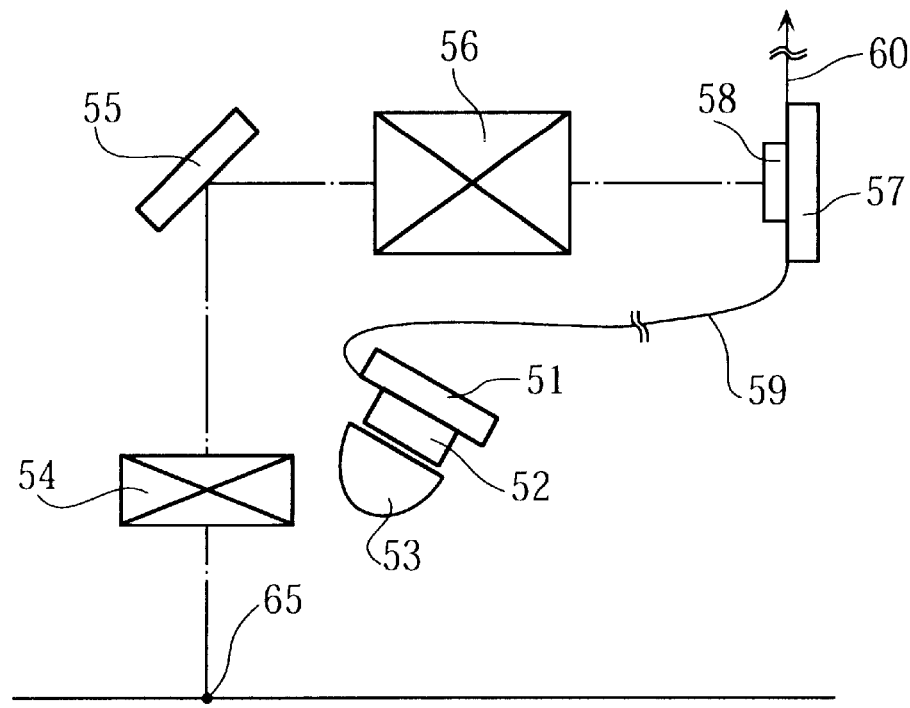
FIG. 31 schematically illustrates the structure of a prior art serial type color image sensor.
Figure 32:
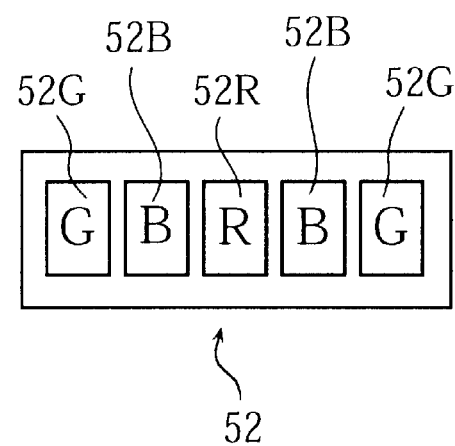
FIG. 32 is a plan view of a semiconductor sensor incorporated in the prior art serial type color image sensor.

Further, instead of the clip connector 11, use may be made of a clip pin 43, as shown in FIG. 30. With this structure, it is possible to solder an FPC or an FFC, which leads to cost reduction.

What is claimed is:

1. A color image sensor movable relative to a document at least in a secondary scanning direction transverse to a primary scanning direction for reading an image on the document, comprising:
    a white light emitting diode for emitting white light;
    a generally sector-shaped prism having a shorter edge surface facing a white light emitting surface of the white light emitting diode and extending longitudinally in the primary scanning direction, a longer edge surface facing a read surface of the document and extending longitudinally in the primary scanning direction, a front surface and a rear surface spaced from each other in the thickness direction of the prism, the front and rear surfaces being so curved as to collect white light emitted from the white light emitting diode onto the read surface of the document;
    a semiconductor color sensor including a plurality of red light receiving elements spaced from each other in the primary scanning direction, a plurality of blue light receiving elements spaced from each other in the primary scanning direction and a plurality of green light receiving elements spaced from each other in the primary scanning direction for receiving light reflected on the read surface and for simultaneously outputting red, blue and green image signals; and
    a lens means for forming a non-magnified erect image on the light receiving elements of the semiconductor color sensor in accordance with light reflected on the read surface;
    wherein the a length of the shorter edge surface of the primary extending longitudinally in the primary scanning direction is shorter than a length of the longer edge surface of the prism extending longitudinally in the primary scanning direction.

2. The color image sensor according to claim 1, wherein the color image sensor is movable relative to the document both in the primary scanning direction and the secondary scanning direction for reading the image on the document.

3. An image reading apparatus incorporating the color image sensor according to claim 2,
    wherein the red light receiving elements, the blue light receiving elements and the green light receiving elements of the semiconductor color sensor are respectively arranged at a first pitch in a row extending in the primary scanning direction, the rows of red, blue and green light receiving elements are spaced from each other at a predetermined pitch in the secondary scanning direction; the image reading apparatus comprising:
    a secondary scanning direction driving section for reciprocally moving the document and the color image sensor relative to each other at a second pitch in the secondary scanning direction;
    a primary scanning direction driving section for moving the document and the color image sensor relative to each other at a third pitch in the primary scanning direction after every forward movement and after every reverse movement, respectively, by the secondary scanning direction driving section; and
    an image processing section for combining the image signals of the different colors form the semiconductor color sensor into a set of red, blue, and green image signals for each identical pixel while disregarding a line of image signals which do not contain image signals of either color.

4. The image reading apparatus according to claim 3, wherein the second pitch is equal to the first pitch, the pitch between the rows of red, blue and green light receiving elements in the secondary scanning direction is twice the first pitch.

5. The color image sensor according to claim 1, wherein the lens means comprises a rod lens array.

6. The color image sensor according to claim 1, wherein the lens means comprises a pair of convex lens arrays disposed in series in an optical axis direction.

7. The color image sensor according to claim 1, wherein the white light emitting diode and the semiconductor color sensor are mounted on a common wiring board.

8. The color image sensor according to claim 7, further comprising a housing for accommodating the prism and the lens means;
    the housing having a pair of first counterpart surfaces which face edge surfaces of the wiring board, respectively, and a pair of second counterpart surfaces which face edge surfaces of the white light emitting diode, respectively;
    wherein a total spacing between the second counterpart surfaces of the housing and the edge surfaces of the white light emitting diode is set smaller than a total spacing between the first counterpart surfaces of the housing and the edge surfaces of the wiring board, the white light emitting diode being positionally limited by the second counterpart surfaces, thereby positioning the wiring board.

9. The color image sensor according to claim 1, farther comprising a transparent cover member provided between the read surface and each of the prism and the lens means;
    wherein the cover member is integrally formed on the prism.

10. The color image sensor according to claim 1, wherein the red light receiving elements, the blue light receiving elements and the green light receiving elements of the semiconductor color sensor are respectively arranged at a predetermined pitch in a row extending in the primary scanning direction, the rows of red, blue and green light receiving elements are spaced from each other at a predetermined pitch in the secondary scanning direction.

11. The color image sensor according to claim 10, which is a serial type color image sensor wherein the pitch between the rows of red, blue and green light receiving elements in the secondary scanning direction is twice the pitch between the light receiving elements of a same color in the primary scanning direction.

12. A color image sensor movable relative to a document both in a primary scanning direction and a secondary scanning direction for reading an image on the document, the color image sensor comprising:

a white light emitting diode for irradiating the document with a substantially same brightness along a prescribed reading width measured in the primary scanning direction;

a semiconductor color sensor including a plurality of red light receiving elements arranged at a first pitch in the primary scanning direction, a plurality of blue light receiving elements arranged at the first pitch in the primary scanning direction for receiving light reflected on the document and for simultaneously outputting red, blue and green image signals;

a lens means for forming a non-magnified erect image on the light receiving elements of the semiconductor color sensor in accordance with light reflected on the document; and a clip type connector for supplying electric power to the white light emitting diode and for relaying image signals of each color from the semiconductor color sensor, the connector having a width measured in the primary scanning direction, the width of the connector being substantially equal to said reading width.

13. The color image sensor according to claim 12, wherein the red, blue and green light receiving elements are spaced from each other at a second pitch in the secondary scanning direction, the second pitch being twice the first pitch.

14. The color image sensor according to claim 12, wherein the lens means comprises a rod lens array.

15. The color image sensor according to claim 12, wherein the lens means comprises two convex lens arrays disposed in series in an optical axis direction.

16. The color image sensor according to claim 12, further comprising a housing for accommodating the white light emitting diode, the semiconductor color sensor and the lens means;

wherein the housing is formed with a light guide hole for guiding white light emitted from the white light emitting diode to the document, at least wall surfaces of the housing defining the light guide hole being white.

17. The color image sensor according to claim 16, wherein the housing is entirely white.

18. The color image sensor according to claim 12, wherein the white light emitting diode and the semiconductor color sensor are mounted on a common wiring board.

19. The color image sensor according to claim 18, wherein the clip type connector is mounted on the wiring board.

20. The color image sensor according to claim 19, wherein the connector comprises a clip pin.

21. An image reading apparatus incorporating a color image sensor movable relative to a document both in a primary scanning direction and a secondary scanning direction for reading an image on the document, wherein the color image sensor comprises:

a white light emitting a diode for emitting white light;

a semiconductor color sensor including a plurality of red light receiving elements, a plurality of blue light receiving elements and a plurality of green light receiving elements for receiving light reflected on the document and for simultaneously outputting red, blue and green image signals; and a lens means for forming a non-magnified erect image on the light receiving elements of the semiconductor color sensor in accordance with light reflected on the document;

wherein the red light receiving elements, the blue light receiving elements and the green light receiving elements of the semiconductor color sensor are respectively arranged at a first pitch in a row extending in the primary scanning direction, the rows of red, blue and green light receiving elements are spaced from each other at a predetermined pitch in the secondary scanning direction; the image reading apparatus comprising:

a secondary scanning direction driving section for reciprocally moving the document and the color image sensor relative to each other at a second pitch in the secondary scanning direction;

a primary scanning direction driving section for moving the document and the color image sensor relative to each other at a third pitch in the primary scanning direction after every forward movement and after every reverse movement, respectively, by the secondary scanning direction driving section; and an image processing section for combining the image signals of the different colors from the semiconductor color sensor into a set of red, blue, and green image signals for each identical pixel which disregarding a line of image signals which do not contain image signals of either color.

22. The image reading apparatus according to claim 21, wherein the second pitch is equal to the first pitch, the pitch between the rows of red, blue and green light receiving elements in the secondary scanning direction is twice the first pitch.

* * * * *